United States Patent Office 3,502,436
Patented Mar. 24, 1970

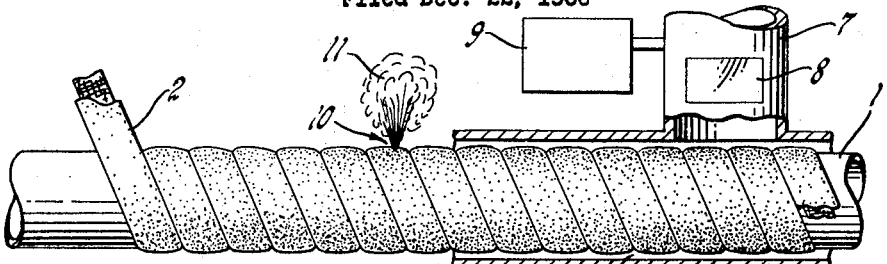
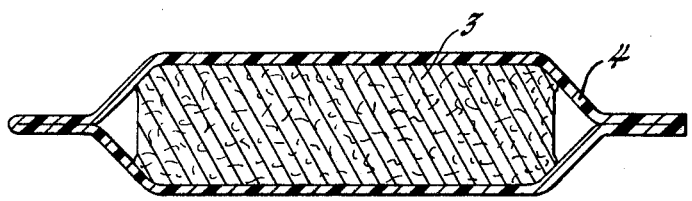
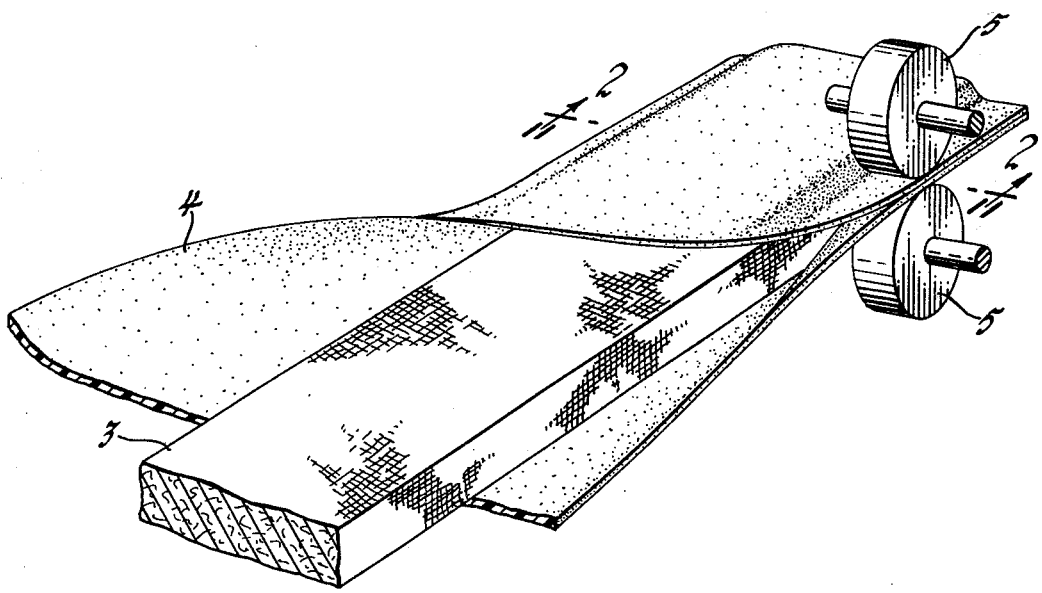

3,502,436
LEAK VISUAL WARNING AND DETECTION DEVICE
Charles T. Hoover and Rowland L. Stedfeld, Indianapolis, Ind., assignors to General Motors Corporation, Detroit, Mich., a corporation of Delaware
Filed Dec. 22, 1966, Ser. No. 603,842
Int. Cl. G01m *3/00, 3/12, 3/22*
U.S. Cl. 23—253   3 Claims

ABSTRACT OF THE DISCLOSURE

A leak-detection device including a tape-like material which is applied to a conduit. The tape is composed of an outer envelope around an inner absorbent material which is saturated with a substance which, when reacted with the substance conveyed in the conduit, provides a visual indication of that reaction, and hence the occurrence of a leak in that conduit.

---

This invention relates generally to leak detection devices and more specifically to devices which give visual indications of the occurrence and situs of leaking fluids.

It is an object of our invention to provide a simple, inexpensive, leak-detection device which responds to the occurrence of a leak and gives a visual indication of the situs of that leak.

It is a further object of our invention to provide a simple and inexpensive warning tape for visually determining the occurrence of gas leaks.

These and other objects of our invention will become more apparent from the detailed disclosure which follows and from the drawing in which:

FIGURE 1 shows a partially sectioned elevation of two embodiments of our invention;

FIGURE 2 shows a transverse sectional view along section line 2—2 of the warning tape shown in FIGURE 3;

FIGURE 3 shows a perspective view of the warning tape of our invention and a process for making same.

Briefly stated, our leak-detection device comprehends an enveloped ribbon of absorbent material which is saturated with a substance which, upon reaction with a fluid to be detected, provides a visual indication of that reaction. The ribbon envelope is composed of any material which is readily penetrated by diffusion, dissolution or chemical reaction by the fluid to be detected. The preferred visual indication resulting from the reaction between the escaping fluid and the saturant is a puff or wisp of smoke. However, other indicia, such as readily apparent discoloration, are acceptable. The ribbon is wrapped about a device or conduit containing the fluid to be detected. With the occurrence of a leak, the fluid penetrates the envelope and reacts with the saturant yielding the desired signal, indication, or telltale of that reaction.

The composition of the envelope material will vary from system to system depending on the composition of the substance to be detected. For the detection of chlorine, polyamide resins formed by the condensation of dibasic organic acids with diamines are preferred. When detecting ammonia, bromine, or sulfur dioxide, a vinyl chloride-vinylidene chloride copolymer or a vinylidene chloride polymer are acceptable. For the detection of hydrocarbons and carbon tetrachloride, ethylcellulose and bituminous material may be used. For the detection of hydrogen chloride linear chain polymeric resins containing amide groups and formed by the condensation of dibasic organic acids with diamines are acceptable. Even certain rubbers may be used for $SO_2$, $CCl_4$, $Cl_2$ and hydrocarbon detection may be suitable.

The composition of the absorbent will also vary from system to system depending on the composition of the substance to be detected. The most preferred absorbent is one which is generally wettable by, yet resistant to the attack of, the saturant. It is likewise preferred that the absorbent not be susceptible to the attack of the substance to be detected. This is so because a nonattacked absorbent will wick unreacted saturant to the situs of the reaction better than will an absorbent which is itself attacked. However, even absorbents which are susceptible to attack by the substance to be detected will be effective for at least a short time. As will be discussed in more detail hereinafter, we prefer to use cotton as an absorbent for detecting $Cl_2$ leaks. Asbestos, fiberglass wicks, etc., however, may also be used for this and other applications. The absorbent can be physically in the form of a loose or matted batting, a braided material, or the like.

The composition of the saturant will also vary from system to system, depending on the composition of the substance to be detected. For $Cl_2$ detection, ammonia water is the preferred saturant as its reaction with $Cl_2$ yields a puff or a wisp of smoke-like visibly noticeable particles. Other saturants may be used which yield different visual indicia (e.g., color changes) incident to contact with the substance to be detected. Hence, for example, for acid or basic substances, solutions of any of the common indicators, such as phenothymolphthalein, methyl red, phenol red, bromphenol blue, etc. may be used as saturants.

Of particular interest herein is an indicator or warning-tape for the detection of chlorine leaks in storage tanks, conduits, etc. Such a chlorine detection device is a tape-like detector formed of a cotton absorbent ribbon saturated with ammonia water and enclosed in an outer casing to prevent evaporation. Saturation of the wick is preferred, but substantially any high degree of wetting is acceptable. The outer casing or envelope may be any one of a variety of materials such as one which is attacked by chlorine, but not ammonia. We prefer the use of plastic envelopes, but other materials such as metal foils (e.g., tin and aluminum) or rubber (e.g., vulcanized neoprene) may also be used. Upon the local destruction of a portion of the envelope incident to a leak, chlorine vapor reacts with the ammonia vapor to form small particles of ammonium chloride which appear as smoke.

FIGURE 1 shows a gas (e.g., chlorine) conduit 1 having the warning-tape 2 of our invention wound about its outer diameter. The left-hand portion of FIGURE 1 is illustrative of those situations where the warning tape is used in conjunction with only a single conduit. With the occurrence of a $Cl_2$ leak 10, the plastic envelope of the warning-tape 2 is attacked, the $NH_3$ reacted with the $Cl_2$, and a visual indication, in the form of a wisp of smoke 11, points out the situs of the leak.

The right-hand portion of FIGURE 1 is illustrative of another embodiment of our invention wherein the warning-tape 2 is used in combination with a detector station such as a remotely located sight-glass or window 8 or electrochemical gas analyzer 9 or the like. In this other embodiment, as shown by the right portion of FIGURE 1, a second conduit or pipe 6 encloses the tape-wound conduit 1. The annular space 12 between the tape-wound conduit 1 and conduit 6 serves to conduct the smoke to any chlorine-ammonium chloride particles to conduit 7 which the conduit 7 may be either open-ended or closed, as would be the case when it is connected to a $Cl_2$ trap or sump (not shown). When conduit 7 is closed, the $NH_4Cl$ is seen through sightglass or window 8. When conduit 7 is open-ended, the $NH_4Cl$ emanates from the open end. The open end of conduit 7 or sightglass 8 is so located as to be conspicuously noticeable to the attendant or operator of the system. In addition to the sight-glass 8, an electrochemical detector may also be connected to the annulus between conduits 1 and 6, either directly or via conduit 7. With appropriate amplifier and relay means operatively associated with the electrochemical detector the chlorine gas may be shut off and/or a warning light or bell energized.

FIGURE 3 shows the simplicity with which the warning-tape of our invention may be fabricated. A wick-like material 3, such as cotton, is saturated with an aqueous ammonia solution. As a practical matter, the solution should contain at least 5% ammonia. We prefer, however, to use a saturated solution of ammonia. The ammonia-soaked cotton is placed on a strip of foil or film 4. The strip 4 is folded over so as to envelope the ammonia-soaked cotton and subsequently hermetically sealed, as by the heat-sealing rolls 5, at the joint where the edges of the folded film meet. For uniformity sake, the other longitudinal edge of the tape may also be heat sealed as shown in FIGURE 2. Other techniques for sealing the envelope may also be used (e.g., $NH_3$ resistant cements).

The composition of the foil or film, of course, is not particularly critical as long as it has the essential properties of being resistant to the attack of ammonia and susceptible to the attack of chlorine. We prefer generally to use plastic films but metal foils are also acceptable. Of particular interest for use with $Cl_2$ detection is nylon film. "Nylon" is a trademark belonging to E. I. du Pont de Nemours & Company and defines those polymeric resins formed by the condensation of dibasic organic acids with diamines into linear chains containing amide groups. Nylon films are generally available in widths up to 60 inches and thicknesses between 0.0005–0.010 inch. Other plastics, such as polyvinyl chloride (PVC), polyethylene, polyester, and cellulose acetate are other possible materials which might be used instead of nylon. The selection of materials could better be made if the exact mechanism of the $Cl_2$ attack were better understood. However, it is not. It is thought to be either an acid attack by the strong HCl formed when $Cl_2$ is exposed o humid air or an oxidation attack of the film by the $Cl_2$. It is even possible that the mechanism of attack is a combination of these two. In any event, nylon is susceptible to both forms of attack. Other materials such as PVC (plasticized) are not susceptible to acid attack but are to oxidation attack. Polyethylene is also susceptible to oxidation attack, but slower than PVC. Polyesters are susceptible to both acid and oxidation attack, but not to the same extent as nylon. Cellulose acetate and cellophane are very susceptible to both acid and oxidation attack. However, they are also attacked by alkaline solutions and therefore slowly attacked by the ammoniacal saturant. For the metal foils aluminum is best because it will retain most $NH_3$ concentrations at average temperatures and yet is completely attacked by $Cl_2$, wet or dry.

The dimensions of our warning tape are not particularly critical. However, we prefer to use warning-tape having a width of about 1–2" and a nylon film thickness between about 0.002 and 0.010". The choice of dimensions for any given application will, of course, depend upon the choice of material for that application.

With the occurrence of a leak 10 (FIG. 1), attack of the film, and reaction of the $NH_3$ with the $Cl_2$, ammonium chloride is formed, typically as small particles, and is suspended in the chlorine gas coming from the leak 10. The suspended particles appear as smoke 11. As the ammonia, in the region about the leak, is consumed in the chemical reaction, it is replaced in that region by the capillary action of the wick which tends to transport more ammonia from the more remote saturated portions of the wick. With this replacement of the ammonia to the depleted regions, a continuous wisp of ammonium chloride smoke emanates from the situs of the leak.

Though we have disclosed our invention solely in terms of certain embodiments thereof, we do not intend to be limited thereto, except as defined by the claims which follow.

We claim:
1. A leak detection and visual warning device for signaling by means of a smoke telltale the occurrence of chlorine leaking from a conduit, said device comprising a ribbon of an absorbent material having ammonia absorbed therein, and an elongated hollow envelope enclosing said ribbon wherein said envelope comprises a plastic film in which said film is selected from the group consisting of polyamide resins formed by the condensation of dibasic organic acids with diamines, polyvinyl chlorides, polyethylene, polyesters and cellulose acetate.

2. A device as claimed in claim 1 being in combination with a detector station means and means for conducting said smoke to said detection station.

3. A device as claimed in claim 2 wherein said film is a polyamide resin.

References Cited
UNITED STATES PATENTS
| | | | |
|---|---|---|---|
| 2,708,896 | 5/1955 | Smith et al. | |
| 3,232,710 | 2/1966 | Reickmann et al. | |
| 3,406,017 | 10/1968 | Canning | 23—232 |

OTHER REFERENCES
Billmeyer, F. W.: Textbook of Polymer Science, pp. 388–93, 546 (1962).

MORRIS O. WOLK, Primary Examiner

E. A. KATZ, Assistant Examiner

U.S. Cl. X.R.
23—219; 137—551